US012736747B2

(12) United States Patent
Ding et al.

(10) Patent No.: US 12,736,747 B2
(45) Date of Patent: Sep. 15, 2026

(54) PHOTONIC CHIPS INCLUDING A STRUCTURE ENABLING MEASUREMENT OF THE GROUP VELOCITY OF LIGHT IN A PHOTONIC COMPONENT

(71) Applicant: GlobalFoundries U.S. Inc., Malta, NY (US)

(72) Inventors: Hanyi Ding, Colchester, VT (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 354 days.

(21) Appl. No.: 18/581,687

(22) Filed: Feb. 20, 2024

(65) Prior Publication Data

US 2025/0264659 A1 Aug. 21, 2025

(51) Int. Cl.
*G02B 6/12* (2006.01)
*G02B 6/125* (2006.01)
*G02B 6/126* (2006.01)

(52) U.S. Cl.
CPC ......... *G02B 6/12004* (2013.01); *G02B 6/125* (2013.01); *G02B 6/126* (2013.01); *G02B 2006/1215* (2013.01)

(58) Field of Classification Search
CPC .... G02B 6/12004; G02B 6/125; G02B 6/126; G02B 2006/1215; G02B 6/2773; G02B 2006/12116; G02B 6/12002; G02B 2006/12
See application file for complete search history.

(56) References Cited

U.S. PATENT DOCUMENTS

| | | | | |
|---|---|---|---|---|
| 10,816,725 | B2 * | 10/2020 | Bian | G02B 6/125 |
| 2017/0163000 | A1 * | 6/2017 | Evans | H01S 5/1028 |
| 2020/0225401 | A1 * | 7/2020 | Yu | G02B 6/0043 |
| 2022/0299707 | A1 * | 9/2022 | Chen | G02B 6/12016 |
| 2022/0308297 | A1 * | 9/2022 | Polomoff | G02B 6/4248 |

OTHER PUBLICATIONS

C. J. Oton et al., "Silicon photonic waveguide metrology using Mach-Zehnder interferometers," Optics Express, vol. 24, Issue 6, pp. 6265-6270 (2016), https://doi.org/10.1364/OE.24.006265.
Yufei Xing et al., "Accurate extraction of fabricated geometry using optical measurement," Photonics Research, vol. 6, Issue 11, pp. 1008-1020 (2018) https://doi.org/10.1364/PRJ.6.001008.

(Continued)

*Primary Examiner* — Jennifer Doan
(74) *Attorney, Agent, or Firm* — Thompson Hine LLP; Anthony Canale

(57) ABSTRACT

Structures for a photonic chip that enable the measurement of the group velocity of light in a photonic component and methods of forming such structures. The structure comprises a photonic component having an input and an output, a first waveguide core including a first section coupled to the input of the photonic component, and a second waveguide core including a second section coupled to the output of the photonic component. The structure further comprises a first reflector adjacent to the first section of the first waveguide core, and a second reflector adjacent to the second section of the second waveguide core.

20 Claims, 10 Drawing Sheets

(56) References Cited

OTHER PUBLICATIONS

Todd H. Stievater et al., "Optical and geometric parameter extraction for photonic integrated circuits," Optics Express, vol. 30, Issue 9, pp. 14453-14460 (2022), https://doi.org/10.1364/OE.451719.

Wesley D. Sacher et al., "Tri-layer silicon nitride-on-silicon photonic platform for ultra-low-loss crossings and interlayer transitions." Optics Express, vol. 25, Issue 25, pp. 30862-30875 (2017) https://opg.optica.org/oe/fulltext.cfm?uri=oe-25-25-30862&id=377328.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "Monolithically integrated self-aligned SiN edge coupler with <0.6/0.8 dB TE/TM insertion loss, <-39 dB back reflection and >520 mW high-power handling capability," in Optical Fiber Communication Conference (OFC) 2023, Technical Digest Series (Optica Publishing Group, 2023), paper M3C.3.

* cited by examiner 4A
50
48
4A
L3
L2
L1
4
4
46
32
10

50
48
32
24
18
16
22
11
13

24
22
18
16
50
48
31
30
12
29
46
10
14
20

PHOTONIC CHIPS INCLUDING A STRUCTURE ENABLING MEASUREMENT OF THE GROUP VELOCITY OF LIGHT IN A PHOTONIC COMPONENT

BACKGROUND

This disclosure relates to photonic chips and, more specifically, to structures for a photonic chip that enable the measurement of the group velocity of light in a photonic component and methods of forming such structures.

Photonic chips are used in many applications and systems including, but not limited to, data communication systems and data computation systems. A photonic chip includes a photonic integrated circuit comprised of interconnected photonic components, such as modulators, polarizers, and couplers, that are used to manipulate light received from a light source, such as an optical fiber or a laser.

The group velocity is the velocity with which the envelope of a pulse of light propagates in a medium. The group index may be represented by a ratio of the group velocity in vacuum to the group velocity in the medium. Knowledge of the group velocity may be important when designing certain photonic integrated circuits or when performing diagnostics of certain photonic integrated circuits.

Improved structures for a photonic chip that enable the measurement of the group velocity of light in a photonic component and methods of forming such structures are needed.

SUMMARY

In an embodiment of the invention, a structure for a photonic chip is provided. The structure comprises a photonic component having an input and an output, a first waveguide core including a first section coupled to the input of the photonic component, and a second waveguide core including a second section coupled to the output of the photonic component. The structure further comprises a first reflector adjacent to the first section of the first waveguide core, and a second reflector adjacent to the second section of the second waveguide core.

In an embodiment of the invention, a method of forming a structure for a photonic chip is provided. The method comprises forming a photonic component, forming a first waveguide core including a first section coupled to an input of the photonic component, and forming a second waveguide core including a second section coupled to an output of the photonic component. The method further comprises forming a first reflector adjacent to the first section of the first waveguide core and forming a second reflector adjacent to the second section of the second waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
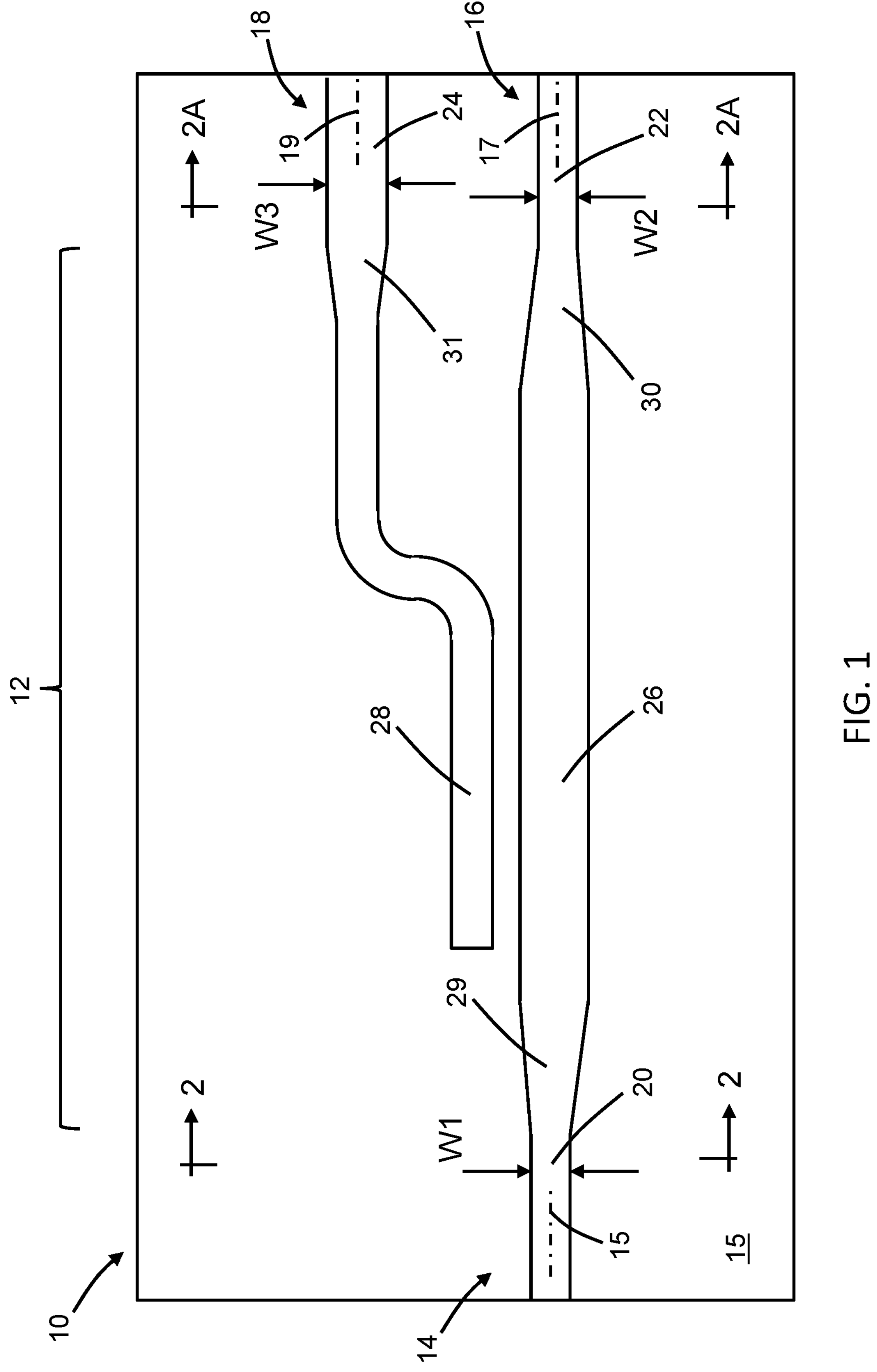
FIG. 1 is a top view of a structure at an initial fabrication stage of a processing method in accordance with embodiments of the invention.
Figure 2:
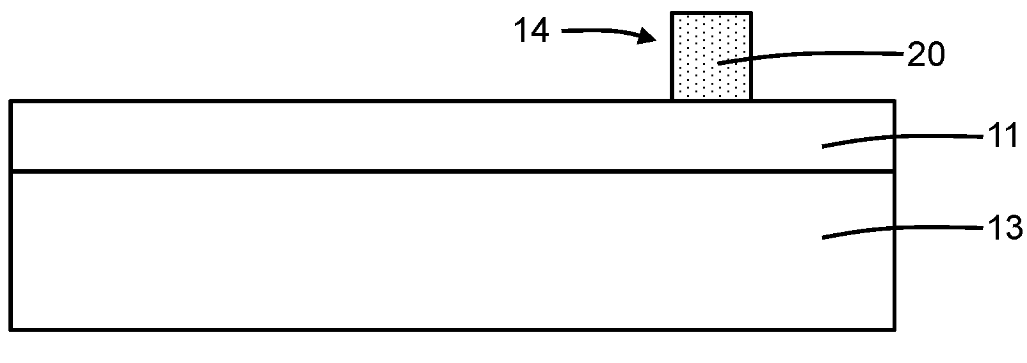
FIG. 2 is a cross-sectional view taken generally along line 2-2 in FIG. 1.
Figure 2A:
FIG. 2A is a cross-sectional view taken generally along line 2A-2A in FIG. 1.

With reference to FIGS. 1, 2, 2A and in accordance with embodiments of the invention, a structure 10 for a photonic chip includes a polarization splitter-rotator 12 and waveguide cores 14, 16, 18 that are positioned on, and above, a dielectric layer 11 and a semiconductor substrate 13. In an embodiment, the dielectric layer 11 may be comprised of a dielectric material, such as silicon dioxide, and the semiconductor substrate 13 may be comprised of a semiconductor material, such as single-crystal silicon. In an embodiment, the dielectric layer 11 may be a buried oxide layer of a silicon-on-insulator substrate, and the dielectric layer 11 may provide low-index cladding that separates the waveguide cores 14, 16, 18 and the polarization splitter-rotator 12 from the semiconductor substrate 13.

The waveguide core 14 includes a section 20 that is disposed adjacent to the polarization splitter-rotator 12. The waveguide core 16 includes a section 22 that is disposed adjacent to the polarization splitter-rotator 12. The waveguide core 18 includes a section 24 that is disposed adjacent to the polarization splitter-rotator 12. The polarization splitter-rotator 12 is disposed in a space on the photonic chip between the section 20 of the waveguide core 14 and the sections 22, 24 of the waveguide cores 16, 18.

The polarization splitter-rotator 12 has an input to which the section 20 of the waveguide core 14 is coupled. Specifically, the section 20 of the waveguide core 14 may be physically connected to an arm 26 of the polarization splitter-rotator 12 at the input to the polarization splitter-rotator 12. In an embodiment, the section 20 of the waveguide core 14 may be directly connected to the arm 26 of the polarization splitter-rotator 12 at the input to the polarization splitter-rotator 12.

The polarization splitter-rotator 12 has an output to which the section 22 of the waveguide core 16 is coupled. Specifically, the section 22 of the waveguide core 16 may be connected to the arm 26 of the polarization splitter-rotator 12 at the output from the polarization splitter-rotator 12. In an embodiment, the section 22 of the waveguide core 16 may be directly connected to the arm 26 of the polarization splitter-rotator 12 at the output from the polarization splitter-rotator 12.

In an embodiment, the polarization splitter-rotator 12 may have another output to which the section 24 of the waveguide core 18 is coupled. Specifically, the section 24 of the waveguide core 18 may be connected to an arm 28 of the polarization splitter-rotator 12 at the output from the polarization splitter-rotator 12. In an embodiment, the section 24 of the waveguide core 18 may be directly connected to the arm 28 of the polarization splitter-rotator 12 at the output from the polarization splitter-rotator 12.

The section 20 of the waveguide core 14 may have a longitudinal axis 15 and a width W1 in a direction that is transverse to the longitudinal axis 15. The section 22 of the waveguide core 16 may have a longitudinal axis 17 and a width W2 in a direction that is transverse to the longitudinal axis 17. The section 24 of the waveguide core 18 may have a longitudinal axis 19 and a width W3 in a direction that is transverse to the longitudinal axis 19. In an embodiment, the width W2 may differ from the width W1. In an embodiment, the width W3 may differ from the width W1. In an embodiment, the width W2 may differ from the width W3. In an embodiment, the widths W1, W2, and W3 may all differ.

In an embodiment, the waveguide cores 14, 16, 18 and the arms 26, 28 of the polarization splitter-rotator 12 may be comprised of a material having a refractive index that is greater than the refractive index of silicon dioxide. In an embodiment, the waveguide cores 14, 16, 18 and the arms 26, 28 of the polarization splitter-rotator 12 may be comprised of a semiconductor material. In an embodiment, the waveguide cores 14, 16, 18 and the arms 26, 28 of the polarization splitter-rotator 12 may be comprised of single-crystal silicon. In an embodiment, the waveguide cores 14, 16, 18 and the arms 26, 28 of the polarization splitter-rotator 12 may be comprised of polysilicon or amorphous silicon. The waveguide cores 14, 16, 18 and the arms 26, 28 of the polarization splitter-rotator 12 may be formed by patterning a layer comprised of their constituent material with lithography and etching processes. In an embodiment, the waveguide cores 14, 16, 18 and the arms 26, 28 of the polarization splitter-rotator 12 may be formed by patterning the semiconductor material (e.g., single-crystal silicon) of the device layer of a silicon-on-insulator substrate. In an alternative embodiment, the waveguide cores 14, 16, 18 and the arms 26, 28 of the polarization splitter-rotator 12 may be comprised of a dielectric material, such as silicon nitride, silicon oxynitride, or aluminum nitride. In alternative embodiments, other materials, such as a III-V compound semiconductor, may be used to form the waveguide cores 14, 16, 18 and the arms 26, 28 of the polarization splitter-rotator 12.

The polarization splitter-rotator 12 represents a photonic component that may have a relatively large footprint on the photonic chip. In alternative embodiments, the polarization splitter-rotator 12 may be replaced by a different type of photonic component, such as an edge coupler, a spot-size converter, an interlayer elevator, a multi-mode interferometer, etc., that may also have a relatively large footprint on the photonic chip. The photonic component may have a different number of inputs and/or a different number of outputs than in the representative embodiment of the structure 10. In an alternative embodiment, the semiconductor substrate 13 may include an undercut beneath all or part of the photonic component.

Figure 3:
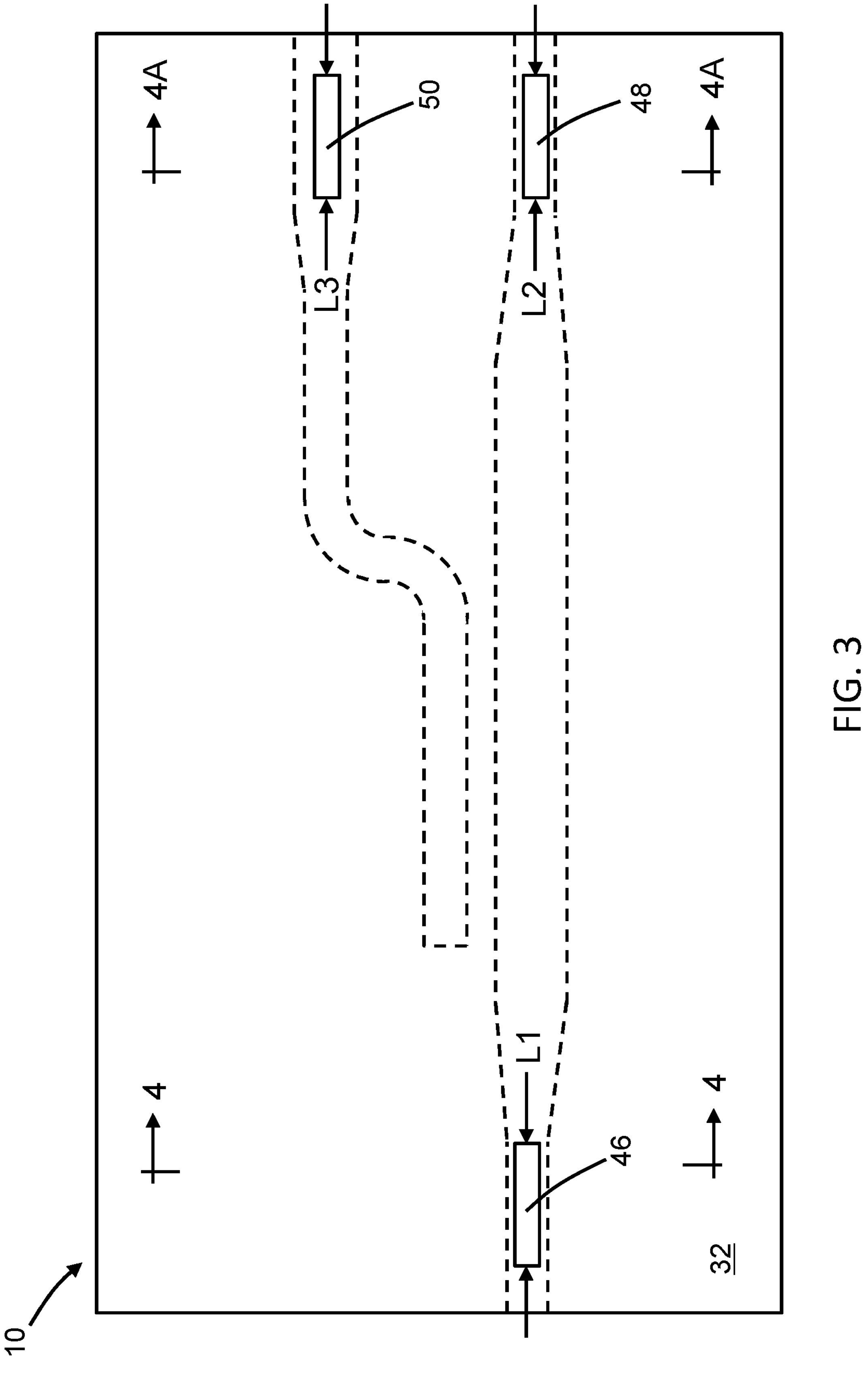
FIG. 3 is a top view of the structure at a fabrication stage of the processing method subsequent to FIGS. 1, 2, 2A.
Figures 4, 4A:
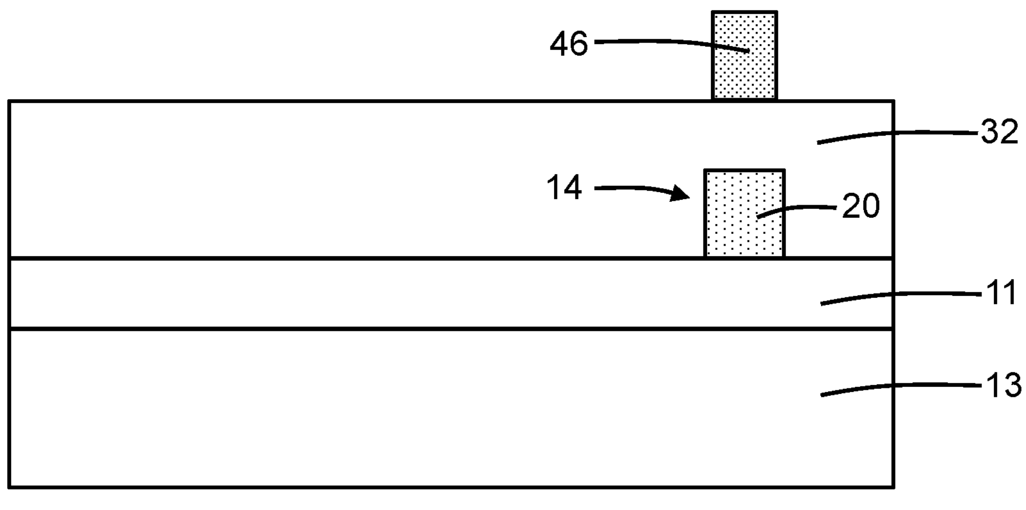
FIG. 4 is a cross-sectional view taken generally along line 4-4 in FIG. 3.
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, a dielectric layer 32 may be formed over the polarization splitter-rotator 12 and waveguide cores 14, 16, 18. The dielectric layer 32 may be comprised of a dielectric material, such as silicon dioxide, having a refractive index that is less than the refractive index of the material constituting the arms 26, 28 of the polarization splitter-rotator 12 and the waveguide cores 14, 16, 18.

The structure 10 further includes waveguide core regions 46, 48, 50 that are positioned on, and above, the dielectric layer 44 and that are respectively adjacent to the sections 20, 22, 24 of the waveguide cores 14, 16, 18. The waveguide core region 46 is disposed over the section 20 of the waveguide core 14 and overlaps with the section 20. The waveguide core region 48 is disposed over the section 22 of the waveguide core 16 and overlaps with the section 22. The waveguide core region 50 is disposed over the section 24 of the waveguide core 18 and overlaps with the section 24. The waveguide core regions 46, 48, 50 may be disposed outside of the footprint for the polarization splitter-rotator 12 with the waveguide core region 46 disposed adjacent to the input to the polarization splitter-rotator 12 and the waveguide core regions 48, 50 respectively disposed adjacent to the outputs from the polarization splitter-rotator 12.

In an embodiment, the waveguide core regions 46, 48, 50 may be comprised of a material having a refractive index that is greater than the refractive index of silicon dioxide. In an embodiment, the waveguide core regions 46, 48, 50 may be comprised of a different material from the waveguide cores 14, 16, 18 and the arms 26, 28 of the polarization splitter-rotator 12. In an embodiment, the waveguide core regions 46, 48, 50 may be comprised of a material having a different refractive index from the waveguide cores 14, 16, 18 and the arms 26, 28 of the polarization splitter-rotator 12. In an embodiment, the waveguide core regions 46, 48, 50 may be comprised of a dielectric material, such as silicon nitride, silicon oxynitride, or aluminum nitride. The waveguide core regions 46, 48, 50 may be formed by depositing a layer comprised of their constituent material and patterning the deposited layer with lithography and etching processes. In an alternative embodiment, the waveguide core regions 46, 48, 50 may be comprised of a semiconductor material, such as polysilicon or amorphous silicon. In an alternative embodiment, the waveguide core regions 46, 48, 50 may be comprised of germanium. In an alternative embodiment, the waveguide core regions 46, 48, 50 may be comprised of a metal, such as copper. In alternative embodiments, other materials, such as a III-V compound semiconductor, may be used to form the waveguide core regions 46, 48, 50.

In an embodiment, the waveguide core region 46 may have a length L1 that is less than about three times the width W1 of the section 20 of the waveguide core 14. In an embodiment, the length L1 of the waveguide core region 46 may be greater than one-quarter of the width W1 of the section 20 of the waveguide core 14 and less than about three times the width W1 of the section 20 of the waveguide core 14. The length L1 may be measured in a direction parallel to the longitudinal axis 15 of the section 20 of the waveguide core 14 and transverse to the width W1.

In an embodiment, the waveguide core region 48 may have a length L2 that is less than three times the width W2 of the section 22 of the waveguide core 16. In an embodiment, the length L2 of the waveguide core region 48 may be greater than one-quarter of the width W2 of the section 22 of the waveguide core 16 and less than about three times the width W2 of the section 22 of the waveguide core 16. The length L2 may be measured in a direction parallel to the longitudinal axis 17 of the section 22 of the waveguide core 16 and transverse to the width W2.

In an embodiment, the waveguide core region 50 may have a length L3 that is less than three times the width W3 of the section 24 of the waveguide core 18. In an embodiment, the length L3 of the waveguide core region 50 may be greater than one-quarter of the width W3 of the section 24 of the waveguide core 18 and less than about three times the width W3 of the section 24 of the waveguide core 18. The length L3 may be measured in a direction parallel to the longitudinal axis 19 of the section 24 of the waveguide core 18 and transverse to the width W3.

In an embodiment, the lengths L1, L2, and L3 may be equal. In an embodiment, the lengths L1, L2, and L3 may all differ from each other. In an embodiment, the length L2 may differ from the length L1. In an embodiment, the length L3 may differ from the length L1. In an embodiment, the length L2 may differ from the length L3.

Figure 5:
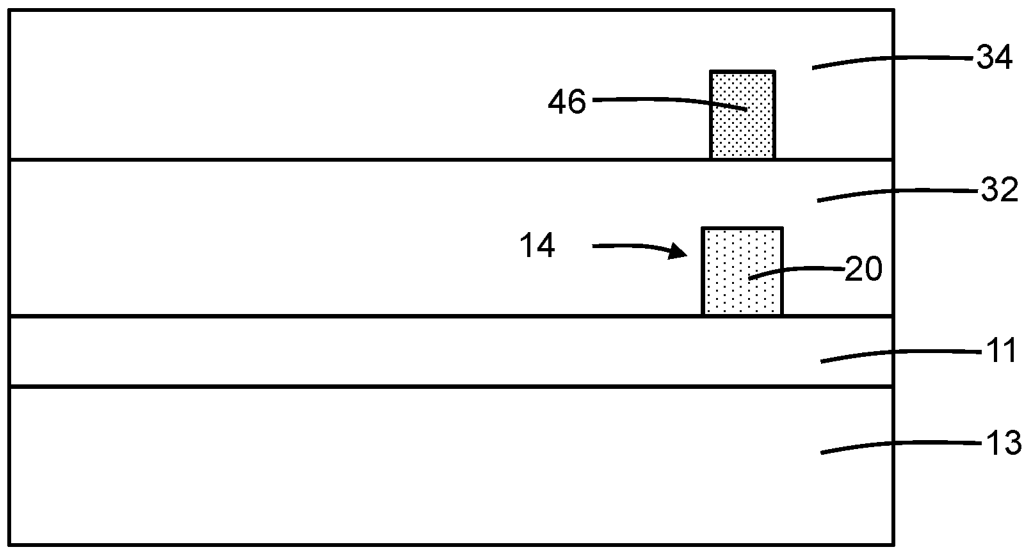
FIGS. 5, 5A are cross-sectional views of the structure at a fabrication stage of the processing method subsequent to FIGS. 3, 4, 4A.
Figure 5A:
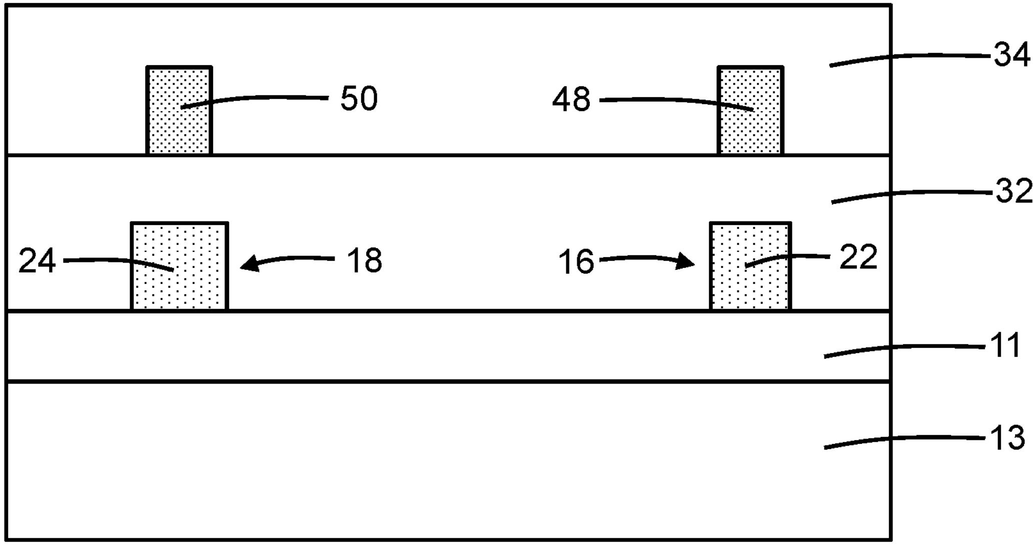

With reference to FIGS. 5, 5A, 5B in which like reference numerals refer to like features in FIGS. 3, 4, 4A, 4B and at a subsequent fabrication stage, a dielectric layer 34 may be formed over the dielectric layer 32 and the waveguide core regions 46, 48, 50. The dielectric layer 34 may be comprised of a dielectric material, such as silicon dioxide, having a refractive index that is less than the refractive index of the material constituting the waveguide core regions 46, 48, 50.

In use, light (e.g., laser light) propagates in the waveguide core 14 toward the polarization splitter-rotator 12 and is directed into the arm 26 of the polarization splitter-rotator 12 by the section 20 of the waveguide core 14. The waveguide core region 46 acts as a perturbation in the waveguide core 14 at the input to the polarization splitter-rotator 12 that reflects or redirects a fraction of the light in a reverse propagation direction. A portion of the light propagating in the arm 26 of the polarization splitter-rotator 12 is transferred to the arm 28 of the polarization splitter-rotator 12. A non-transferred portion of the light is output from the arm 26 to the section 22 of the waveguide core 16. The waveguide core region 48 acts as a perturbation in the waveguide core 16 at one of the outputs from the polarization splitter-rotator 12 that reflects or redirects a fraction of the light propagating in the section 22 in a reverse propagation direction. The transferred portion of the light is output from the arm 28 to the section 24 of the waveguide core 18. The waveguide core region 50 acts as a perturbation in the waveguide core 18 at the other of the outputs from the polarization splitter-rotator 12 that reflects or redirects a fraction of the light propagating in the section 24 in a reverse propagation direction.

The waveguide core region 46 provides a reflector disposed at the input to the polarization splitter-rotator 12. The waveguide core regions 48, 50 provide reflectors disposed at the outputs from the polarization splitter-rotator 12. The distance between the waveguide core region 46 and the waveguide core region 48 approximates the distance between the input and the associated output from the polarization splitter-rotator 12. The distance between the waveguide core region 46 and the waveguide core region 50 may also approximate the distance between the input and the other associated output from the polarization splitter-rotator 12. The distance between the waveguide core region 46 and each of the waveguide core regions 48, 50 is a numerical quantity that may be known from the device layout for the polarization splitter-rotator 12. A time differential exists between the light reflected from the waveguide core region 46 and the light reflected from the waveguide core region 48 and/or the waveguide core region 50. The difference in the time of arrival, at a diagnostic device, between the light reflected from the waveguide core region 46 and the light reflected from the waveguide core region 48 and/or the waveguide core region 50 may be used to determine the group velocity and the group index of the polarization splitter-rotator 12. The group velocity and the group index may be used for diagnostic purposes and/or for design purposes.

Figure 6:
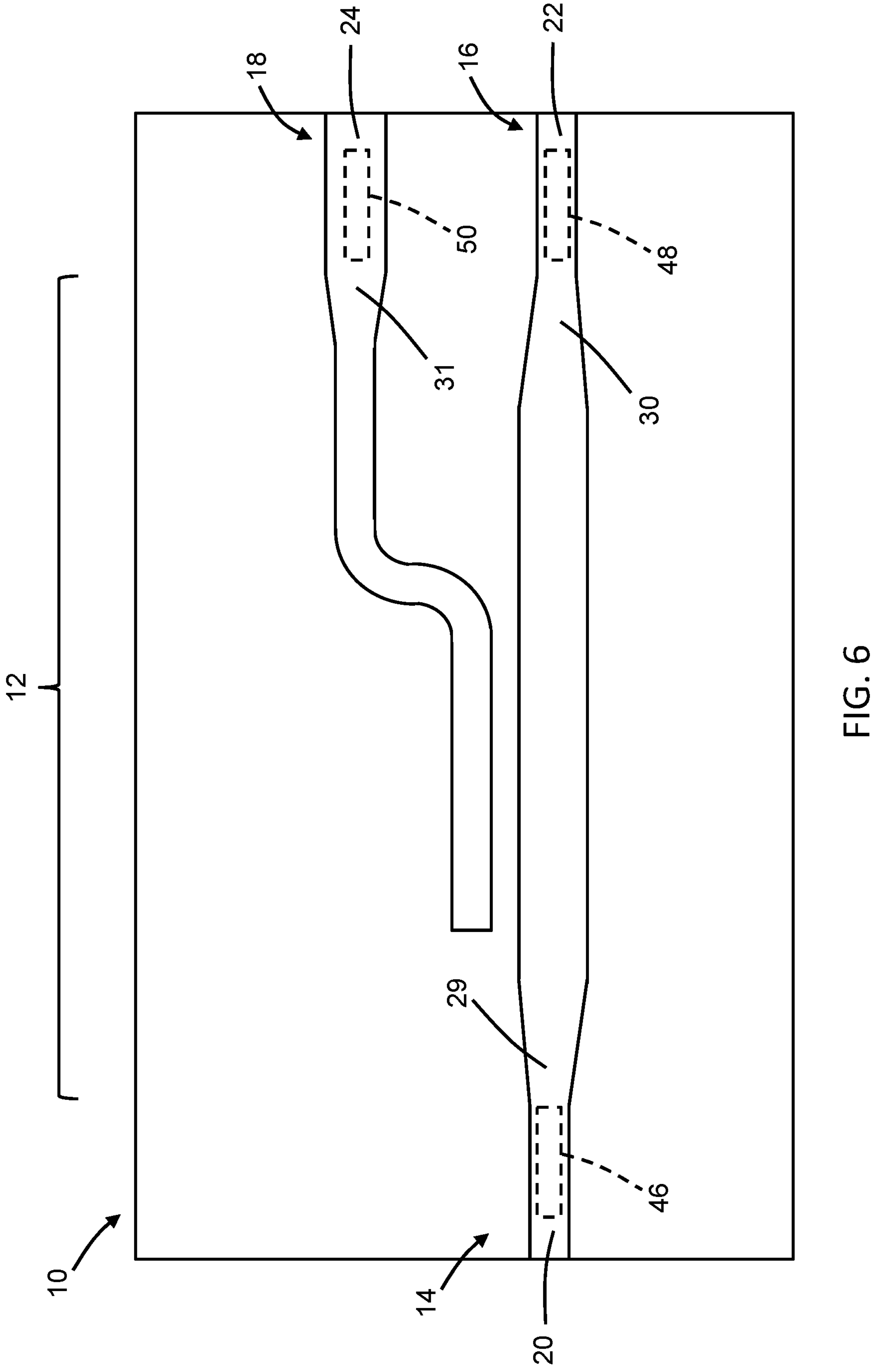
FIG. 6 is a top view of a structure in accordance with alternative embodiments of the invention.

With reference to FIG. 6 and in accordance with alternative embodiments, the structure 10 may be modified such that the waveguide core regions 46, 48, 50 are formed before the polarization splitter-rotator 12 and waveguide cores 14, 16, 18. The waveguide core regions 46, 48, 50 are positioned on, and above, the dielectric layer 11 and the semiconductor substrate 13. The waveguide cores 14, 16, 18 are positioned on, and above, the dielectric layer 32 such that the waveguide core regions 46, 48, 50 are disposed between the respective sections 20, 22, 24 of the waveguide cores 14, 16, 18 and the semiconductor substrate 13. The section 20 of the waveguide core 14 overlaps with the waveguide core region 46, the section 22 of the waveguide core 16 overlaps with the waveguide core region 48, and the section 24 of the waveguide core 18 overlaps with the waveguide core region 50. The material used to form the waveguide core regions 46, 48, 50 may be swapped with the material used to form the waveguide cores 14, 16, 18.

Figure 7:
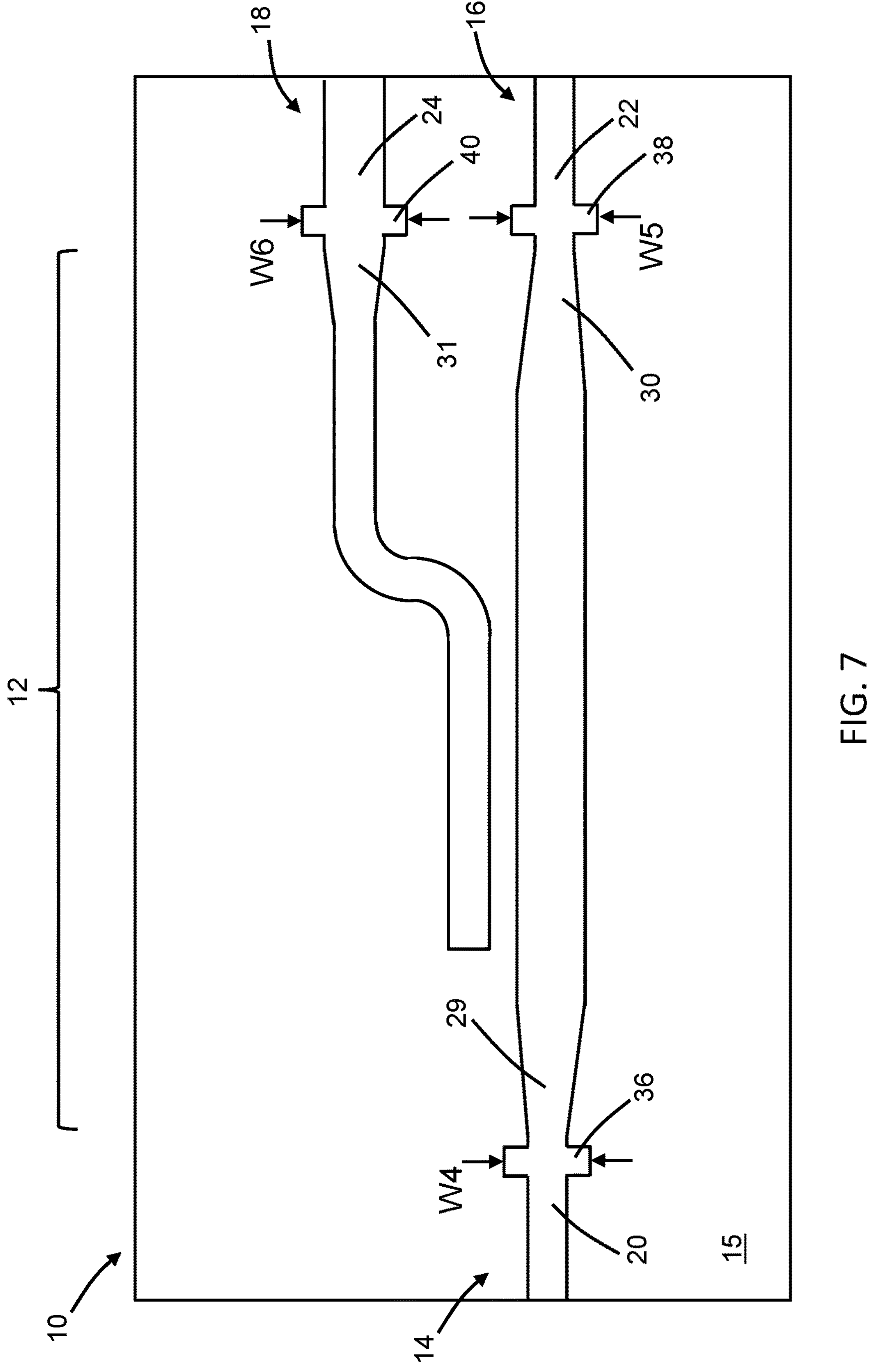
FIG. 7 is a top view of a structure in accordance with alternative embodiments of the invention.

With reference to FIG. 7 and in accordance with alternative embodiments, the waveguide cores 14, 16, 18 may integrate respective waveguide core regions 36, 38, 40 that provide reflectors configured to replace the waveguide core regions 46, 48, 50. The waveguide core region 36 extends across the waveguide core 14 and projects from both sidewalls of the waveguide core 14. In an embodiment, the waveguide core region 36 may extend across the waveguide core 14 transverse to the longitudinal axis 15. The waveguide core region 36 has a width W4 that is greater than the width W1 of adjacent regions of the waveguide core 14. The waveguide core region 38 extends across the waveguide core 16 and projects from both sidewalls of the waveguide core 16. In an embodiment, the waveguide core region 38 may extend across the waveguide core 16 transverse to the longitudinal axis 17. The waveguide core region 38 has a width W5 that is greater than the width W2 of adjacent regions of the waveguide core 16. The waveguide core region 40 extends across the waveguide core 18 and projects from both sidewalls of the waveguide core 18. In an embodiment, the waveguide core region 40 may extend across the waveguide core 18 transverse to the longitudinal axis 19. The waveguide core region 40 has a width W6 that is greater than the width W3 of adjacent regions of the waveguide core 18. In an embodiment, waveguide core regions 36, 38, 40 may be comprised of the same material as the waveguide core regions 46, 48, 50.

The enhanced widths of the waveguide core regions 36, 38, 40 provide respective perturbations at the input to the polarization splitter-rotator 12 and the outputs from the polarization splitter-rotator 12 that reflect or redirect light in a reverse direction and that may be used to determine group velocity.

Figure 8:
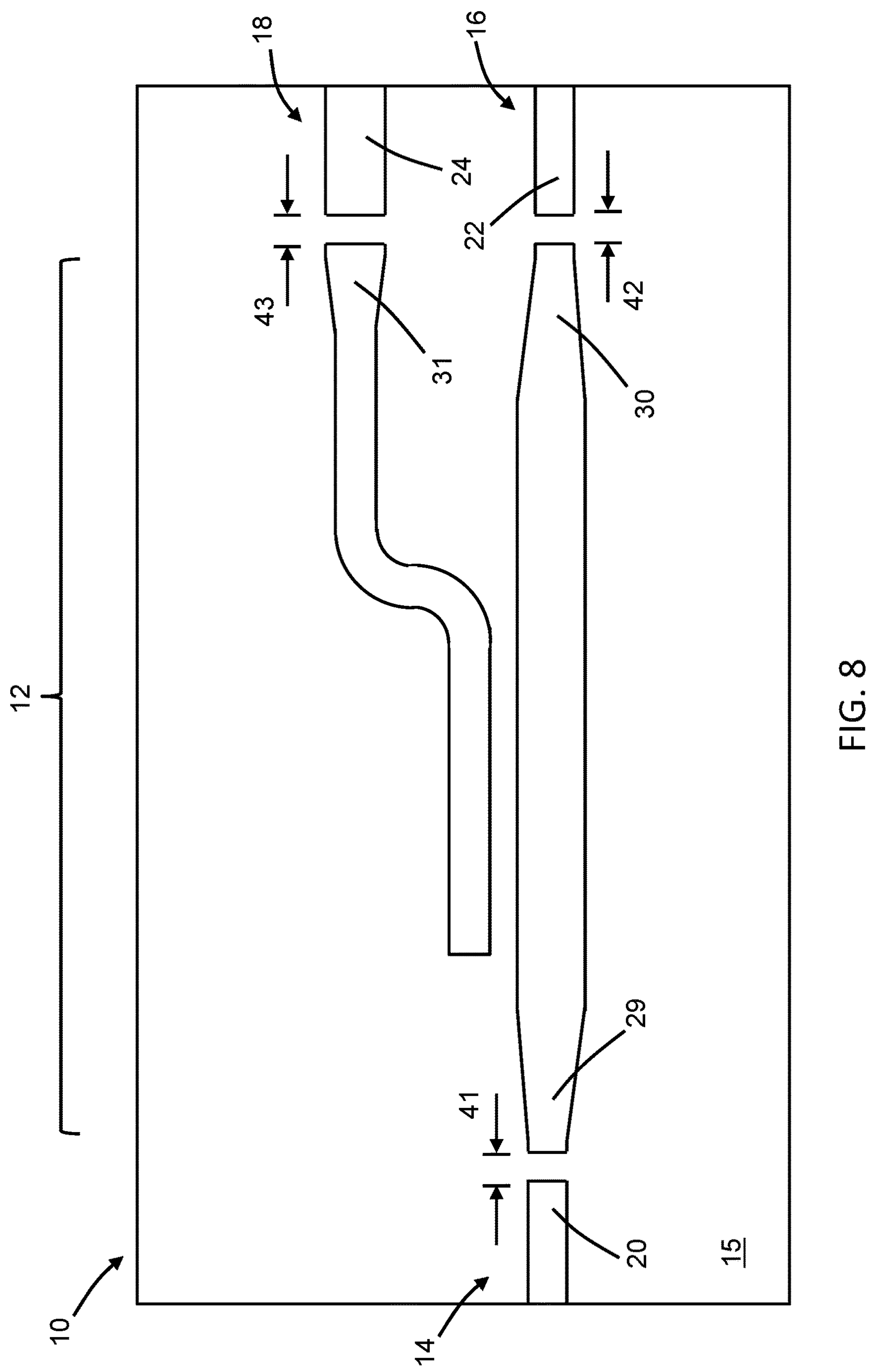
FIG. 8 is a top view of a structure in accordance with alternative embodiments of the invention.

With reference to FIG. 8 and in accordance with alternative embodiments, the waveguide cores 14, 16, 18 may integrate respective waveguide core regions 41, 42, 43 that provide reflectors configured to replace the waveguide core regions 46, 48, 50. The waveguide core regions 41, 42, 43 provide perturbations at the input to the polarization splitter-rotator 12 and the outputs from the polarization splitter-rotator 12 that reflect or redirect light in a reverse direction and that may be used to determine group velocity.

The waveguide core region 41 extends as a slot across the width W1 of the waveguide core 14 as a separator between adjacent solid waveguide core regions of the waveguide core 14. In an embodiment, the waveguide core region 41 may extend as a slot across the full width W1 of the waveguide core 14. In an embodiment, the waveguide core region 41 may extend across the full width W1 of the waveguide core 14 and through a full thickness of the waveguide core 14. In an embodiment, the waveguide core region 41 may extend as a notched slot across the full width W1 of the waveguide core 14 and through a partial thickness of the waveguide core 14.

The waveguide core region 42 extends as a slot across the width W2 of the waveguide core 16 as a separator between adjacent solid waveguide core regions of the waveguide core 16. In an embodiment, the waveguide core region 42 may extend as a slot across the full width W2 of the waveguide core 16. In an embodiment, the waveguide core region 42 may extend across the full width W2 of the waveguide core 16 and through a full thickness of the waveguide core 16. In an embodiment, the waveguide core region 42 may extend as a notched slot across the full width W2 of the waveguide core 16 and through a partial thickness of the waveguide core 16.

The waveguide core region 43 extends as a slot across the width W3 of the waveguide core 18 as a separator between adjacent solid waveguide core regions of the waveguide core 18. In an embodiment, the waveguide core region 43 may extend as a slot across the full width W3 of the waveguide core 18. In an embodiment, the waveguide core region 43 may extend across the full width W3 of the waveguide core 18 and through a full thickness of the waveguide core 18. In an embodiment, the waveguide core region 43 may extend as a notched slot across the full width W3 of the waveguide core 18 and through a partial thickness of the waveguide core 18.

Figure 9:
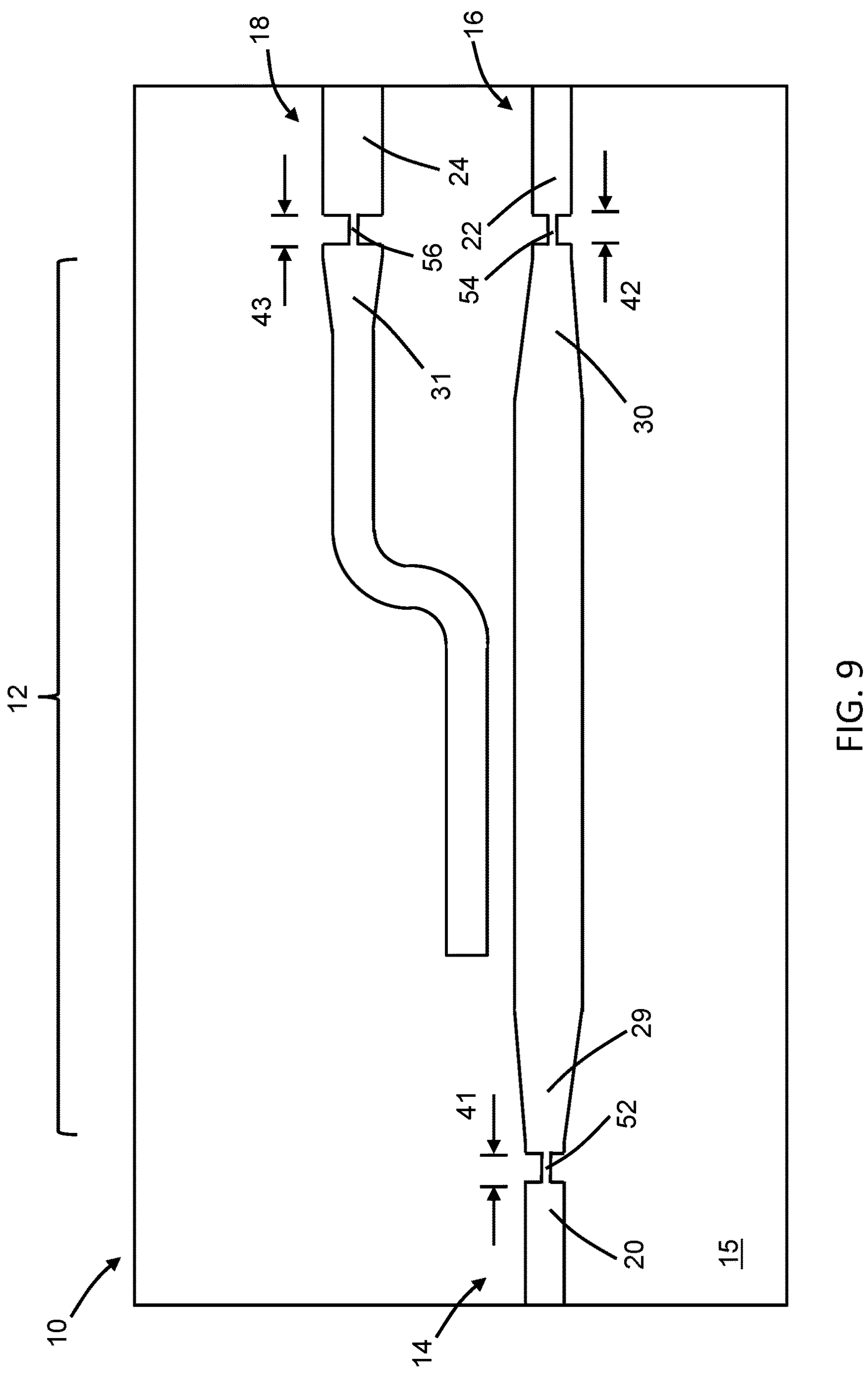
FIG. 9 is a top view of a structure in accordance with alternative embodiments of the invention.

With reference to FIG. 9 and in accordance with alternative embodiments, the waveguide core region 41 of the waveguide core 14 may be a slot and may include a rib 52 that extends across the slot as a connector between the adjacent solid waveguide core regions of the waveguide core 14. The rib 52 has a width that is less than the width W1 of the section 20 of the waveguide core 14 such that the section 20 is characterized by multiple width dimensions. The waveguide core region 42 of the waveguide core 16 may be a slot and may include a rib 54 that extends across the slot as a connector between the adjacent solid waveguide core regions of the waveguide core 16. The rib 54 has a width that is less than the width W2 of the section 22 of the waveguide core 16 such that the section 22 is characterized by multiple width dimensions. The waveguide core region 43 of the waveguide core 18 may be a slot and may include a rib 56 that extends across the slot as a connector between the adjacent solid waveguide core regions of the waveguide core 18. The rib 56 has a width that is less than the width W3 of the section 24 of the waveguide core 18 such that the section 24 is characterized by multiple width dimensions.

In an alternative embodiment, the waveguide core region 41 may be replicated to define multiple slots extending across the full width W1 of the waveguide core 14 and the multiple slots may be optionally connected by the rib 52. In an alternative embodiment, the waveguide core region 42 may be replicated to define multiple slots across the full width W2 of the waveguide core 16 and the multiple slots may be optionally connected by the rib 54. In an alternative embodiment, the waveguide core region 43 may be replicated to define multiple slots extending across the full width W3 of the waveguide core 18 and the multiple slots may be optionally connected by the rib 56.

Figure 10:
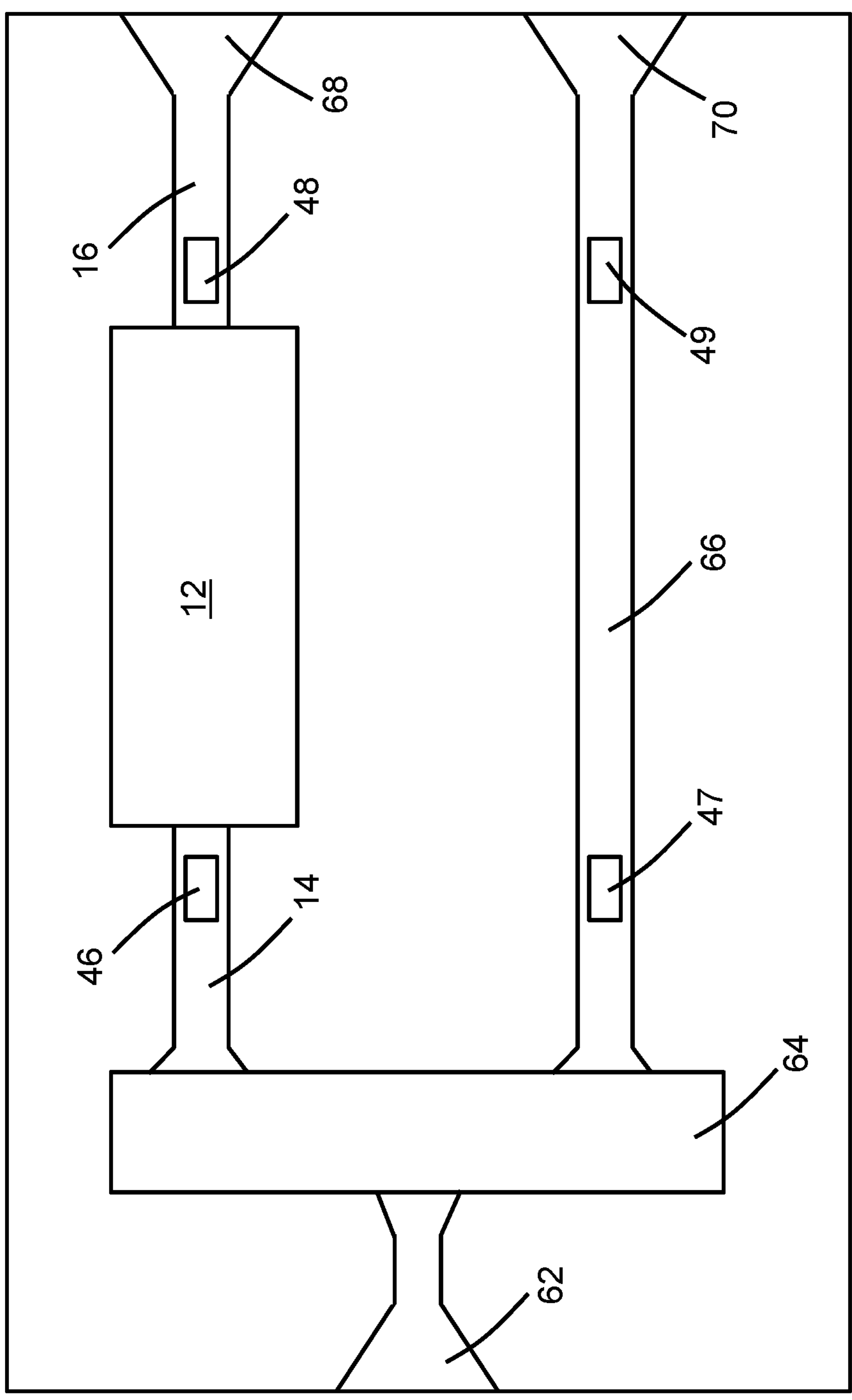
FIG. 10 is a top view of a structure in accordance with alternative embodiments of the invention.

With reference to FIG. 10 and in accordance with alternative embodiments, the structure 10 may include a grating coupler 62 that is coupled by a multimode interference region 64 to the waveguide core 14, a waveguide core 66 that is coupled to the multimode interference region 64, a grating coupler 68 that is coupled to the waveguide core 16, and a grating coupler 70 that is coupled to the waveguide core 66. In an alternative embodiment, the grating couplers 62, 68, 70 may be replaced by edge couplers. In addition to the waveguide core region 46 over the section 20 of the waveguide core 14 and the waveguide core region 48 over the section 22 of the waveguide core 16, waveguide core regions 47, 49 may be disposed over sections of the waveguide core 66 at opposite ends of the waveguide core 66 to define reflectors. In an alternative embodiment, the waveguide core regions 47, 49 may disposed under the sections of the waveguide core 66 at opposite ends of the waveguide core 66 to define reflectors. The waveguide core 66 may define a reference path for light that can be used to de-embed the insertion loss arising from the waveguide core region 46.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as “about”, “approximately”, and “substantially”, are not to be limited to the precise value specified. The language of approximation may correspond to the precision of an instrument used to measure the value or, unless otherwise dependent on the precision of the instrument, may indicate a range of +/−10% of the stated value(s).

References herein to terms such as “vertical”, “horizontal”, etc. are made by way of example, and not by way of limitation, to establish a frame of reference. The term “horizontal” as used herein is defined as a plane parallel to a conventional plane of a semiconductor substrate, regardless of its actual three-dimensional spatial orientation. The terms “vertical” and “normal” refer to a direction in the frame of reference perpendicular to the horizontal, as just defined. The term “lateral” refers to a direction in the frame of reference within the horizontal plane.

A feature “connected” or “coupled” to or with another feature may be directly connected or coupled to or with the other feature or, instead, one or more intervening features may be present. A feature may be “directly connected” or “directly coupled” to or with another feature if intervening features are absent. A feature may be “indirectly connected” or “indirectly coupled” to or with another feature if at least one intervening feature is present. A feature “on” or “contacting” another feature may be directly on or in direct contact with the other feature or, instead, one or more intervening features may be present. A feature may be “directly on” or in “direct contact” with another feature if intervening features are absent. A feature may be “indirectly on” or in “indirect contact” with another feature if at least one intervening feature is present. Different features “overlap” if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonic chip, the structure comprising:

a semiconductor substrate;

a photonic component having an input and a first output;

a first waveguide core including a first section coupled to the input of the photonic component;

a second waveguide core including a second section coupled to the first output of the photonic component;

a first reflector adjacent to the first section of the first waveguide core; and a second reflector adjacent to the second section of the second waveguide core, wherein the first section of the first waveguide core is disposed between the first reflector and the semiconductor substrate, and the second section of the second waveguide core is disposed between the second reflector and the semiconductor substrate.

2. The structure of claim 1 wherein the photonic component is a polarization splitter-rotator.

3. The structure of claim 1 wherein the photonic component has a second output, and further comprising:

a third waveguide core including a third section coupled to the second output of the photonic component; and a third reflector adjacent to the third section of the third waveguide core.

4. The structure of claim 1 wherein the first reflector comprises a first waveguide core region, and the second reflector comprises a second waveguide core region.

5. The structure of claim 4 wherein the first waveguide core region overlaps with the first section of the first waveguide core, and the second waveguide core region overlaps with the second section of the second waveguide core.

6. The structure of claim 4 wherein the first waveguide core and the second waveguide core comprise a first material, and the first waveguide core region and the second waveguide core region comprise a second material that differs from the first material.

7. The structure of claim 4 wherein the first waveguide core has a first longitudinal axis and a first width transverse to the first longitudinal axis, the first waveguide core region has a first length parallel to the first longitudinal axis, and the first length ranges from less than three times the first width to one-quarter of the first width.

8. The structure of claim 7 wherein the second waveguide core has a second longitudinal axis and a second width transverse to the second longitudinal axis, the second waveguide core region has a second length parallel to the second longitudinal axis, and the second length ranges from less than three times the second width to one-quarter of the second width.

9. A structure for a photonic chip, the structure comprising:

a semiconductor substrate;

a photonic component having an input and a first output;

a first waveguide core including a first section coupled to the input of the photonic component;

a second waveguide core including a second section coupled to the first output of the photonic component;

a first reflector adjacent to the first section of the first waveguide core; and a second reflector adjacent to the second section of the second waveguide core, wherein the first reflector is disposed between the first section of the first waveguide core and the semiconductor substrate, and the second reflector is disposed between the second section of the second waveguide core and the semiconductor substrate.

10. The structure of claim 9 wherein the first reflector comprises a first waveguide core region, and the second reflector comprises a second waveguide core region.

11. The structure of claim 10 wherein the first section of the first waveguide core overlaps with the first waveguide core region, and the second section of the second waveguide core overlaps with the second waveguide core region.

12. The structure of claim 10 wherein the first waveguide core and the second waveguide core comprise a first material, and the first waveguide core region and the second waveguide core region comprise a second material that differs from the first material.

13. The structure of claim 10 wherein the first waveguide core has a first longitudinal axis and a first width transverse to the first longitudinal axis, the first waveguide core region has a first length parallel to the first longitudinal axis, and the first length ranges from less than three times the first width to one-quarter of the first width.

14. The structure of claim 13 wherein the second waveguide core has a second longitudinal axis and a second width transverse to the second longitudinal axis, the second waveguide core region has a second length parallel to the second longitudinal axis, and the second length ranges from less than three times the second width to one-quarter of the second width.

15. The structure of claim 1 wherein the first reflector is a first slot in the first section of the first waveguide core, and the second reflector is a second slot in the second section of the second waveguide core.

16. The structure of claim 15 wherein the first section of the first waveguide core has a first width, the second section of the second waveguide core has a second width, the first slot extends fully across the first width of the first section of the first waveguide core, and the second slot extends fully across the second width of the second section of the second waveguide core.

17. The structure of claim 1 wherein the first section of the first waveguide core has a first width, the second section of the second waveguide core has a second width, the first reflector is a region of the first section having a third width that is greater than the first width of the first section of the first waveguide core, and the second reflector is a region of the second section having a fourth width that is greater than the second width of the second section of the second waveguide core.

18. The structure of claim 1 wherein the first section of the first waveguide core has a first waveguide core region, a second waveguide core region, and a third waveguide core region connected by the first waveguide core region to the second waveguide core region, the first waveguide core region has a first width, the second waveguide core region and the third waveguide core region have a second width, and the first width is less than the second width.

19. A method of forming a structure for a photonic chip, the method comprising:

forming a photonic component having an input and an output;

forming a first waveguide core including a first section coupled to the input of the photonic component;

forming a second waveguide core including a second section coupled to the output of the photonic component;

forming a first reflector adjacent to the first section of the first waveguide core; and forming a second reflector adjacent to the second section of the second waveguide core, wherein the first section of the first waveguide core is disposed between the first reflector and a semiconductor substrate, and the second section of the second waveguide core is disposed between the second reflector and the semiconductor substrate.

20. The structure of claim 9 wherein the photonic component is a polarization splitter-rotator.

* * * * *